United States Patent [19]
Grisebach

[11] 4,382,619
[45] May 10, 1983

[54] HYDRAULIC COUPLING DEVICE

[75] Inventor: Hans-Theodor Grisebach, Unna, Fed. Rep. of Germany

[73] Assignee: Gewerkschaft Eisenhutte Westfalia, Lunen, Fed. Rep. of Germany

[21] Appl. No.: 223,246

[22] Filed: Jan. 8, 1981

[30] Foreign Application Priority Data

Jan. 31, 1980 [DE] Fed. Rep. of Germany ....... 3003377

[51] Int. Cl.³ ............................................. F16L 39/00
[52] U.S. Cl. ................................ 285/137 R; 285/24; 285/325
[58] Field of Search ..................... 285/137 R, 325, 24, 285/27, 61, 62, 63, 326, 56–60; 248/68 R, 73, 223.4; 403/331, 375, 154, 155, 240

[56] References Cited

U.S. PATENT DOCUMENTS

| | | | |
|---|---|---|---|
| 879,176 | 2/1900 | Jackson | 285/59 |
| 1,031,531 | 7/1912 | Cramer | 285/60 X |
| 1,490,805 | 4/1924 | Divekey | 285/57 X |
| 3,590,855 | 7/1971 | Woollen | 285/137 R |
| 3,695,638 | 10/1972 | Blakeley | 285/112 |
| 3,911,794 | 10/1975 | Cheshir | 285/137 R X |
| 4,113,287 | 9/1978 | Bogatirev et al. | 285/137 R |
| 4,247,135 | 1/1981 | Weirith et al. | 285/137 R |

FOREIGN PATENT DOCUMENTS 1255417 11/1967 Fed. Rep. of Germany .
700739 11/1979 U.S.S.R. .......................... 285/137 R Primary Examiner—Dave W. Arola
Attorney, Agent, or Firm—Thompson, Birch, Gauthier & Samuels

[57] ABSTRACT

A hydraulic coupling device is provided for connection to a multi-line hose constituted by a plurality of hydraulic conduits bunched together. The coupling device comprises a casing, a plurality of plug pins housed within the casing, and a retaining disc for holding the plug pins. The plug pins are each connectible to a respective conduit of the multi-line hose. Each of the plug pins has a circumferential groove, and the plug pins are held against axial movement in radial slots in the retaining disc. Each of the radial slots has a first portion whose width is greater than the maximum external diameter of the associated plug pin, and a second portion whose width is less than that of the maximum external diameter of the associated plug pin, but which is greater than the diameter of the circumferential groove in that plug pin.

8 Claims, 2 Drawing Figures

HYDRAULIC COUPLING DEVICE

BACKGROUND OF THE INVENTION

This invention relates to a hydraulic coupling device for connection to a multi-line hose constituted by a plurality of hydraulic conduits bunched together. The invention is particularly useful in the hydraulic distribution systems used in underground mine workings, particularly for hydraulic advanceable mine roof support assemblies and other hydraulic appliances.

Systems are known in which numerous hydraulic conduits are bunched together to form multi-line hoses. Multi-line hoses are interconnected by means of pairs of complementary hydraulic coupling devices. One coupling device of each pair houses a plurality of male plug pins which are attached to the conduits of one multi-line hose; and the other coupling device of that pair houses a plurality of female plug pins which are attached to the conduits of a second multi-line hose. The female plug pins mate with the male plug pins when the two coupling devices are attached (usually by the interengagement of complementary screw threads on their casings), thereby connecting the two multi-line hoses. The plug pins are, in each case, held within radial slots provided in a holder mounted in the casing of the coupling device. A hydraulic coupling device of this type is described in German Pat. No. 1 255 417.

The main disadvantage of this known hydraulic coupling device is that the fitting and removal of the plug pins is difficult. This arises because, when the plug pins are introduced into, or withdrawn from, the slots in the holder, they must be in alignment with the longitudinal axis of the coupling device. If the plug pins were not so aligned, introduction would be impossible (or jamming would occur during removal attempts) because of the small amount of play of the plug pins within the slots. With the known type of coupling device, this necessitates that the conduits be angled out beyond the periphery of the holder, in order that the plug pins can be introduced into, and withdrawn from, the slots in the holder. Angling of conduits, particularly where the conduits are of fairly large diameter, is difficult and impedes fitting and removal. Moreover, it is necessary to pull the holder (and the plug pins) out of the casing of the coupling device a relatively long way to permit the angling of the conduits to be carried out at all. This pulling-out operation is difficult, however, and requires the use of considerable force, particularly when the conduits are long.

The aim of the invention is to provide a hydraulic coupling device which does not suffer from these disadvantages.

SUMMARY OF THE INVENTION

The present invention provides a hydraulic coupling device for connection to a multi-line hose constituted by a plurality of hydraulic conduits bunched together, the coupling device comprising a casing, a plurality of plug pins housed within the casing, and a retaining disc for holding plug pins, the plug pins each being connectible to a respective conduit of the multiline hose, each of the plug pins having a circumferential groove, and the plug pins being held against axial movement in radial slots in the retaining disc, wherein each of the radial slots has a first portion whose width is greater than the maximum external diameter of the associated plug pin, and a second portion whose width is less than that of the maximum external diameter of the associated plug pin but which is greater than the diameter of the circumferential groove in that plug pin.

With this hydraulic coupling device, it is not necessary (for example when positioning the plug pins within the radial slots) to angle the conduits beyond the periphery of the retaining disc. All that is needed to position the plug pins is to angle the conduits slightly, and then to introduce the plug pins into the first (usually the widest) portions of the radial slots. The plug pins can then be slid along their radial slots until they are firmly secured with their circumferential grooves in engagement with the second portions of the radial slots. The sliding movement of the plug pins along their radial slots is facilitated by the slight degree of play which is inherent in the construction. The plug pins are removed from the slots in the reverse sequence. Both fitting and removal of the plug pins can be accomplished without having to pull the retaining disc out of the casing to any appreciable extent.

Advantageously, the thickness of the retaining disc is greater than the width of the circumferential grooves in the plug pins. Preferably, each of the radial slots is formed with cut-away portions at one side of the retaining disc, the cut-away portions reducing the thickness of the retaining disc to correspond to the width of the circumferential grooves in the plug pins. As the retaining disc is thicker than the retaining discs of known coupling devices, it is considerably stronger, and so can resist greater traction and thrust forces which arise from changes in the hydraulic pressure in the conduits. Moreover, the relatively large thickness of the retaining disc results in an increased thickness of the disc in the arm portions thereof positioned between the radial slots. In particular, even where the plug pins are positioned relatively closely, the webs which constitute the narrowest parts of the arms are sufficiently strong to resist the traction and thrust forces. Thus, it is possible either to reduce the size of the hydraulic coupling device required for a given number of conduits, or to increase the number of conduits in the associated multiline hose for a given size of hydraulic coupling device.

Conveniently, said cut-away portions are situated in the regions of the second portions of the radial slots. This enables the shoulders defining the grooves of the plug pins to bear against said cut-away portions over as large an area as possible. Consequently, stable fixing of the plug pins against axial displacement is achieved, even when the conduits are under a very high pressure loading.

Preferably, the first portion of each radial slots is positioned radially outwardly of the second portion of that slot. This arrangement permits the plug pins to be introduced even when the final positions of the plug pins are close together.

BRIEF DESCRIPTION OF THE DRAWINGS

A hydraulic coupling device constructed in accordance with the invention will now be described, by way of example, with reference to the accompanying drawings in which.

DESCRIPTION OF PREFERRED EMBODIMENT

Figure 1:
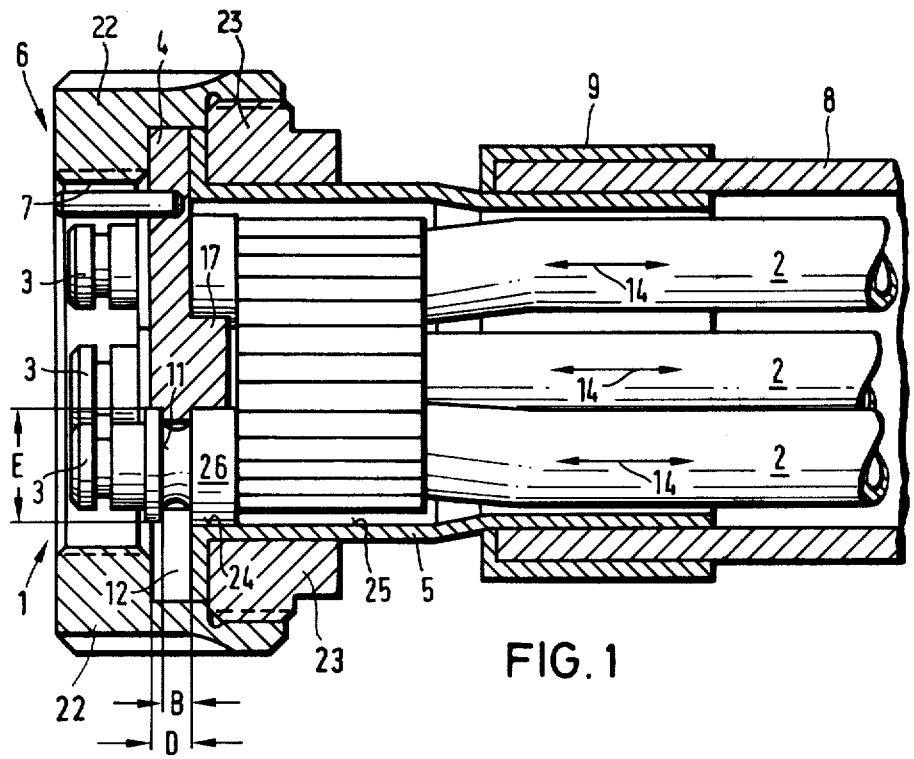
FIG. 1 is a part-sectional side elevation of the hydraulic coupling device.

Referring to the drawings, FIG. 1 shows a hydraulic coupling device 1 connected to a multi-line hose, which is constituted by five flexible conduits (pressure hoses) 2. Each of the flexible conduits 2 is connected to a respective male plug pin 3, the plug pins being held within a casing 6 of the coupling device 1 by means of a retaining disc 4. The retaining disc 4 is itself held in position between the flanged end of a rigid sleeve 5 (which is held within the end portion of the multi-line hose) and an internal shoulder formed by a cut-away portion within the casing 6. The casing 6 takes the form of a screw cap having an internal screw thread 7. A complementary hydraulic coupling device (not shown) having female plug pins, which mate with the male plug pins 3, has an externally-threaded portion which is engageable with the screw thread 7 to connect the coupling devices together. The flexible conduits 2 of the multi-line hose are bunched together within a flexible protective sheath 8, which is press-fitted over the free end of the rigid sleeve 5 by means of a press sleeve 9.

Each of the plug pins 3 has a circumferential groove 11, and each is held in position within a respective radial slot 12 formed in the retaining disc 4. The thickness D of the retaining disc 4 is greater than the width B of the circumferential grooves 11, and one side of the retaining disc has cut-away portions 13 which reduce the thickness of the disc to correspond to the width B. The cut-away portions 13 also increase the width of the slots 12 to at least the maximum external diameter E of the plug pins 3. Thus, the plug pins 2 can be inserted into the slots 12 from the periphery of the disc 4, with their grooves 11 aligned with the cut-away portions 13. The flanges defining the edges of the grooves 11 remote from the conduits 2 thus engage over the shoulders formed by the cut-away portions 13, so that the plug pins 3 are axially held firmly in position.

As the retaining disc 4 is much thicker than the retaining discs of known coupling devices, it is considerably stronger than the known retaining discs. The retaining disc 4 can, therefore, resist greater traction and thrust forces (the directions of which are indicated by the double arrows 14 in FIG. 1), which arise from changes of the hydraulic pressure in the conduits 2. Moreover, the relatively large thickness D of the retaining disc 4 results in an increased thickness of the disc in the arms 15 positioned between the slots 12. In particular, even where the plug pins 3 are positioned relatively closely together, the webs 16 which constitute the narrowest portions of the arms 15, are sufficiently strong (owing to their thickness) to resist the traction and thrust forces. Thus, even where the plug pins 3 are closely spaced, the size of the screw cap 6 can be fully exploited.

That side of the retaining disc 4 remote from the cut-away portions 13 is provided with a central cylindrical boss 17, which constitutes a radial inward support for the inner ends 26 of the plug pins 3. The radially-outer portions of the ends 26 of the plug pins 3 are supported, at 24 (see FIG. 1), by the inner cylindrical surface 25 of the sleeve 5. The boss 17 is formed with five concave grooves (not shown) shaped to match the cylindrical form of the inner ends 26 of the plug pins 3, thereby increasing the radial support the boss 17 provides for the plug pins.

The screw cap 6 is of two-part construction, having an annular sleeve 22 and a threaded ring 23, the threaded ring being screwed into the annular sleeve. The sleeve 5 extends through the threaded ring 23, and its flanged end engages behind the front edge of the threaded ring.

Figure 2:
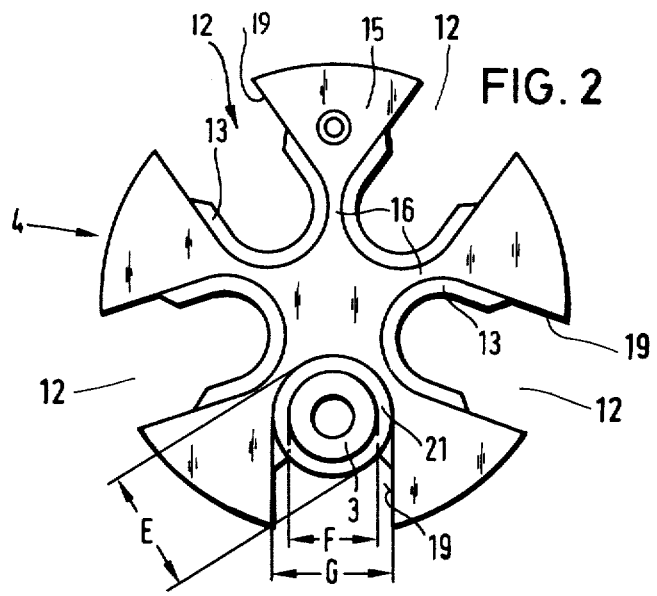
FIG. 2 is an end elevation of the retaining disc of the hydraulic coupling device.

As best seen in FIG. 2, the width of each of the slots 12 increases in the radially-outward direction. Thus, in the region of its cut-away portion 13, each slot 12 has a width F which is slightly larger than the diameter of the grooves 11 in the plug pins 3; and, in the region of the periphery of the retaining disc 4, each slot 12 has a width G which is slightly greater than the maximum external diameter E of the plug pins 3. The region of each cut-away portion 13 merges with the widened portion 19 of its slot 12 via inclined steps, the inclined steps being positioned in the region where the flanges defining the groove 11 of the plug pin 3 engage over the shoulders formed by that cut-away portion 13. FIG. 2 shows only one of the plug pins 3 in the position in which this overlapping occurs.

In order to remove the retaining disc 4 from the hydraulic coupling device 1, it is necessary only to separate the annular sleeve 22 from the threaded ring 23, and then to pull the retaining disc (together with the conduits 2) forwards slightly. In this position, the plug pins 3 can be moved radially outwards, within their slots 12, until they are aligned with the widened portions 19. As this happens, the conduits 2 are angled (and perhaps joggled) slightly. The resultant stresses in the conduits 2 are, however, very slight, so that the plug pins 3 can be easily and comfortably withdrawn from the slots 12 by hand. Fitting of the plug pins 3 is the reverse of this procedure.

It will be apparent that a number of modifications could be made to the hydraulic coupling device described above. Thus, the widened portions 19 of the slots 12 could be at their radially-inner ends instead of their radially-outer ends. In this case, the slots 12 would be closed at both ends, or would terminate in a central hole provided in the disc.

Although the hydraulic coupling device described above has male plug pins and a screw cap having an internal screw thread, it will be apparent that the invention is also applicable to a hydraulic coupling device having

I claim:

1. A hydraulic coupling device for connection to a multi-line hose having a plurality of hydraulic conduits bunched together, the coupling device comprising a casing for housing a plurality of plug pins and a retaining disc, the plug pins each being connectible to a respective conduit of the multi-line hose, each of the plug pins having a circumferential external groove, the retaining disc having a plurality of radial retaining slots for receiving said plug pins, each of said retaining slots having a first portion whose width is greater than the maximum external diameter of the associated plug pin, and a second portion whose width is less than that of the maximum external diameter of the associated plug pin but which is greater than the diameter of the circumferential groove in that plug pin, and means associated with said casing for removably fixing said retaining disc therein and for radially confining said plug pins at locations at which they are held against axial movement relative to said retaining disc as a consequence of their external grooves being mechanically engaged within the second portions of their respective radial slots in the retaining disc.

2. A hydraulic coupling device according to claim 1, wherein the thickness of the retaining disc is greater than the width of the circumferential grooves in the plug pins.

3. A hydraulic coupling device according to claim 2, wherein each of the radial slots is formed with cut-away portions at one side of the retaining disc, the cut-away portions reducing the thickness of the retaining disc to correspond to the width of the circumferential grooves in the plug pins.

4. A hydraulic coupling device according to claim 3, wherein said cut-away portions are situated in the regions of the second portions of the radial slots.

5. A hydraulic coupling device according to claim 1, wherein the first portion of each radial slot is positioned radially outwardly of the second portion of that slot.

6. A hydraulic coupling device according to claim 1, wherein the first portion of each radial slot merges with the second portion of that slot via inclined shoulders.

7. A hydraulic coupling device according to claim 6, wherein the inclined shoulders are positioned in the regions where the circumferential grooves of the plug pins engage the cut-away portions of the retaining disc.

8. A hydraulic coupling device according to claim 1, wherein each of the plug pins is a male plug pin.

* * * * *